April 17, 1956     W. W. CLARKE ET AL     2,742,238
COIL WINDING MACHINE Filed Feb. 2, 1952     8 Sheets-Sheet 1

INVENTORS
WILLIAM W. CLARKE
CLARENCE C. STEVENS
HUBERT BAUER
HAROLD JARVIS, JR.
PHILIP HELLER
BY
*Albert P. Davis*
ATTORNEY April 17, 1956  W. W. CLARKE ET AL  2,742,238
COIL WINDING MACHINE Filed Feb. 2, 1952  8 Sheets-Sheet 3

INVENTORS
WILLIAM W. CLARKE
CLARENCE C. STEVENS
HUBERT BAUER
HAROLD JARVIS, JR.
PHILIP HELLER
BY
Albert P. Davis
ATTORNEY

*INVENTORS*
*WILLIAM W. CLARKE*
*CLARENCE C. STEVENS*
*HUBERT BAUER*
*HAROLD JARVIS, JR.*
*PHILIP HELLER*
BY

*ATTORNEY*

April 17, 1956 W. W. CLARKE ET AL 2,742,238
COIL WINDING MACHINE
Filed Feb. 2, 1952 8 Sheets-Sheet 5

INVENTORS
WILLIAM W. CLARKE
CLARENCE C. STEVENS
HUBERT BAUER
HAROLD JARVIS, JR.
PHILIP HELLER
BY
Albert P. Davis
ATTORNEY April 17, 1956 W. W. CLARKE ET AL 2,742,238
COIL WINDING MACHINE
Filed Feb. 2, 1952 8 Sheets-Sheet 6

INVENTORS
WILLIAM W. CLARKE
CLARENCE C. STEVENS
HUBERT BAUER
HAROLD JARVIS, JR.
PHILIP HELLER
BY
Albert P. Davis
ATTORNEY

INVENTORS
WILLIAM W. CLARKE
CLARENCE C. STEVENS
HUBERT BAUER
HAROLD JARVIS, JR.
PHILIP HELLER
BY
Albert P. Davis
ATTORNEY

Fig.18

United States Patent Office 2,742,238
Patented Apr. 17, 1956

2,742,238

COIL WINDING MACHINE

William W. Clarke, Brookfield, Clarence C. Stevens, Forestville, Hubert Bauer and Harold Jarvis, Jr., Danbury, and Philip Heller, Ridgebury, Conn., assignors to Universal Winding Company, Boston, Mass., a corporation of Massachusetts Application February 2, 1952, Serial No. 269,652

2 Claims. (Cl. 242—9)

The present invention relates to a machine for winding coils of wire, and more particularly relates to such a machine adapted to wind a plurality of coils of wire on a single arbor or core and to have sheets of paper, or other insulating material, inserted between the individual layers of wire in said coils.

Automatic machines have been manufactured and have been widely used for producing such coils. Some of these automatic machines have been extremely complicated and have required the expenditure of considerable time by a highly skilled mechanic to adjust them when the machine has to be adjusted to change from one size or style of coil to another size or style. Accordingly some of these machines are only practical for use on long runs on a single size and style of coil. However, in many factories a wide variety of coils are made, each lot being few in number and, therefore, it has been necessary to (1) wind the coils by hand or (2) make frequent changes at greater expense on an automatic or (3) use a hand-fed machine.

Heretofore there has been at least one hand fed coil winder capable of winding a wide variety of paper interleaf coils and being adjusted by the operator of the machine rather than by a service man for variations in sizes or styles of coils.

This machine has been in general satisfactory but (1) it has not been possible to wind coils with the successive winds separated from each other, i. e., what is known in the trade as a space wind, without disconnecting the traverse drive and substituting for it another traverse drive; (2) the change in the spacing of the turns of wire made necessary by changes in wire sizes have been limited to the number of combinations permitted by a set of speed change gears, or a supplementary mechanism must be employed to smooth out the step-like speed changes obtained by gears; (3) the traversing mechanism employed to reciprocate the wire guide to distribute the wire being wound on the coil has been complicated and the means for reversing the traversing means cumbersome.

Accordingly we provide a coil winding machine adapted to wind a plurality of coils on a single arbor, or a core carried thereby, together with means for quickly and easily adjusting the speed with which the wire traversing means moves relative to the rotational speed of the winding spindle to permit the spacing of the turns of wire in any predetermined manner within the limits of the machine to make it possible to readily change the machine from winding one diameter wire to winding another diameter wire.

We also provide a coil winding machine having reciprocating means for traversing a plurality of strands of wire along a single arbor, or a core carried thereby, to simultaneously wind a plurality of coils thereon, together with adjustable means controlling the length of stroke of the reciprocating means whereby the length of the coils wound can be readily changed to any predetermined length within the limits of the machine.

We also provide a coil winding machine having a reciprocating nonrotating screw for moving a wire guide to lay the strands of wire on the coils being wound, together with means for reciprocating said screw and adjustable means carried by said screw and controlling said reciprocating means.

We also provide a coil winding machine adapted to wind a coil on an arbor, or a core carried thereby, and rotated by a spindle shaft, having traversing means for moving a strand of wire longitudinally of said arbor or core together with means for selectively rotating said spindle shaft at one speed relative to the speed of movement of said traversing means to cause the turns of wire wound on said arbor or core to be laid relatively close to each other or to rotate said spindle shaft at a second speed relative to the speed of said traversing means whereby the turns of wire are spaced relatively far apart.

We also provide a coil winding machine adapted to wind a coil on an arbor, or a core carried thereby, and rotated by a spindle shaft, having traversing means for moving a strand of wire longitudinally of said arbor together with means for selectively rotating said spindle shaft at one speed relative to the speed of movement of said traversing means to cause the turns of wire wound on said arbor or core to be laid relatively close to each other or to rotate said spindle shaft at a second speed relative to the speed of said traversing means whereby the turns of wire are spaced relatively far apart, and a releasable coupling cooperating with said rotating means and said spindle shaft to permit said spindle shaft to selectively be driven at either of said two speeds or to remain motionless.

We also provide a coil winding machine having a winding spindle adapted to rotate an arbor, wire traversing means for reciprocating a strand of wire longitudinally of said arbor together with a planetary gearing mechanism for selectively rotating said shaft at one speed relative to the speed of movement of said traversing means to cause the turns of wire wound on said arbor to be laid relatively close to each other or to rotate said arbor at a second speed relative to the speed of said traversing means whereby the turns of wire are spaced relatively far apart.

We also provide a coil winding machine having wire guiding means that are capable of rapid and accurate adjustment relative to the coil of wire being wound.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

*General description.*—The present invention comprises a coil winding machine of the type adapted to wind multiple layer coils of the type interleaved with sheets of insulation between each layer. It is customary to wind a plurality of these coils simultaneously on a single winding arbor, or a core or tube carried by an arbor, each coil being spaced a predetermined distance from the adjacent coils, to form a "stick" of coils. Each coil in a stick is attached to the adjacent coils by means of the arbor or core and the sheets of insulation, and the individual coils are separated from the stick by cutting through the insulation and core between the coils. In winding sticks of coils the ends of the wires that are to be wound into each individual coil are attached to the arbor or core at the location thereon where the coils are to be wound. The wires may be attached in any convenient manner but usually this is accomplished by means of a strip of adhesive tape. The arbor is then rotated to cause the strands of wire to wind thereon and at the same time the strands are moved longitudinally thereof at a speed which will cause the turns of wire in each individual coil to lay close together. When the wires have been traversed along the arbor a distance equal to the desired coil length a sheet of insulating paper, or other sheet insulating means, having a width approximately equal to the length of the arbor is introduced between the strands of wire and said arbor and is wound into the stick with the wire and the strands of wire are traversed in the other direction to lay the turns on the layer of paper.

The coil winding machine of the present invention comprises a headstock and tailstock that cooperate to hold a winding arbor therebetween for rotation by said headstock with provision for readily removing a completed stick of coils and starting a new stick.

The headstock of the present coil winding machine includes a spindle adapted to rotate the arbor and which is itself rotated by an electrical motor through the intervention of a planetary gear mechanism and a clutch so that the spindle can be selectively rotated at a normal winding speed to lay the turns of wire closely adjacent to each other, at a slower speed to lay the turns of wire spaced from one another, or to disconnect the spindle from the electric motor so that the wire can be moved to either end of the coils without any wire being wound thereon. The spindle is provided with a hand wheel adapted to cooperate with a second hand wheel carried by the tailstock to releasably secure the winding arbor therebetween so that rotation of the spindle causes the arbor and the core carried thereby to rotate to wind a plurality of strands of wire thereon. The two hand wheels are provided with means to facilitate the removal of an arbor having a fully wound stick of coils thereon and the insertion of a second arbor carrying an empty core and to make it possible to quickly and accurately connect the strands of wire to the empty core prior to the winding of a stick of coils thereon. Wire guiding means are provided that are adjustable with respect to the stick of coils being wound and which can be readily locked in a predetermined position while the stick of coils is being wound or which can be locked in an out of the way position when a full stick is being removed from the machine and an empty core being inserted therein.

Traversing means comprising a nonrotating lead screw and a rotatable nut are provided for reciprocating the wire guide longitudinally of the stick of coils to lay the strands of wire thereon to form the coils. Electrically actuated reversing means are provided for driving the rotatable nut in first one direction and then another to reciprocate the lead screw. Adjustable stop means are carried by the lead screw for operating the electrical actuating means at predetermined points in the travel of the lead screw to control the length of the coils of wire wound on the core. A variable speed transmission is driven by the electrical motor that drives the spindle and the variable speed transmission in turn rotates the rotatable nut acting through the reversing means. Manipulation of the variable speed transmission increases or decreases the speed of the lead screw, and in turn the wire guide, relative to the speed of the rotation of the spindle so that the apparatus can be readily adjusted to lay turns of different diameter wires adjacent to each other when the apparatus is changed from winding one size wire to winding another size wire. Marking means comprising a plurality of circular knives are movably mounted beneath the winding arbor and are adapted to be brought into engagement with the stick of coils as winding thereof nears completion to mark the location between each individual coil where the stick should be cut when the coils are separated one from the other.

The coil winding machine embodying the present invention is supported on a bed or table 10 which is carried by a pair of pedestals 12 and 14. The right hand, or tail end pedestal 12 may serve only as a support for the right hand end of bed or table 10 or it can be provided with access openings and be used as a storage compartment. Left hand, or head end pedestal 14 houses an electric motor 62 and a series of speed changing pulleys, all of which will be explained more in detail hereinafter. Bed or table 10 supports a tail stock 18 at its right hand end, a head stock 20 at its left hand end and a series of marking blades 22 and a paper supply shelf 24 intermediate said head and tail stocks, all of which will be explained in detail hereinafter.

Figures 15, 16, 17:
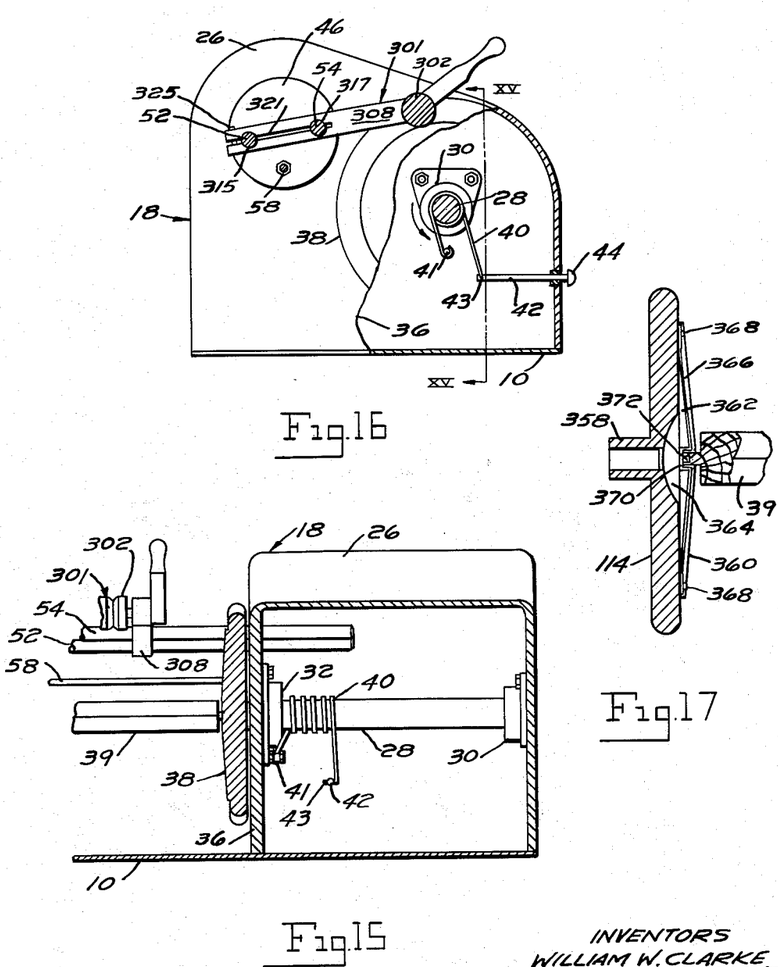
Fig. 15 is a sectional view of the tail stock end of the coil winding machine taken on the line XV—XV of Figure 16 and looking in the direction of the arrows, showing details of the tail stock spindle.
Fig. 16 is a side view with parts broken away of the tail stock end of the coil winding machine.
Fig. 17 is a sectional view of one of the hand wheels employed on the coil winding machine.

*Tail stock.*—Tail stock 18 comprises a housing member 26, see Figs. 15 and 16, secured to the right hand end of bed or table 10 by any convenient means. A tail stock shaft 28 is rotatably journaled in the forward portion of housing 26 by means of a pair of bearings 30 and 32 secured to the right hand and left hand side walls of housing 26. Tail stock shaft 28 extends through left hand side wall 36 and has fixed thereto a hand wheel 38, to be explained in detail hereinafter, adapted to releasably secure one end of an arbor 39 upon which coils are to be wound. A uni-directional clutch comprising a helical spring 40, having one of its ends 41 secured to the housing of bearing 32 by any suitable means, is wrapped around tail stock shaft 28 in such a direction that rotation of said shaft with arbor 39 in a coil winding direction tends to unwind or unwrap said spring, and rotation of said shaft in a coil unwinding direction tends to wind or wrap said spring tightly thereabout. The uni-directional clutch, as it is employed in the instant machine, functions in the nature of a brake to automatically prevent rotation of tail stock shaft 28 in an unwinding direction, due to the tightening of spring 40, but which will not in any way interfere with the rotation of said shaft 28 in a winding direction. Inasmuch as it is sometimes desirable to rotate tail stock shelf 28 in an unwinding direction, in the course of performing certain operations on the stick of coils being wound, means are provided for disengaging spring 40 from shaft 28. Said clutch releasing means comprises a rod 42 having one of its ends connected to the end 43 of clutch spring 40 and having its other end extending through the front wall of housing member 26. The end of rod 42 extending out of housing 26 is provided with a knob or hand piece 44 to facilitate release of the spring 40. Spring 40 can be released from shaft 28, to permit said shaft to rotate in an unwinding direction, by pulling on rod 42 to unwind said spring 40 and to hold it against gripping said shaft.

A circular plate 46 is rotatably journaled in an opening formed in side wall 36 of housing 26 above and to the rear or tail stock shaft 28. Two openings 48 and 50 are formed in circular plate 46 and each of the openings 48 and 50 is provided with a bushing which slidably support the right hand end of rods 52 and 54 which form a part of the wire guiding mechanism to be explained in detail hereinafter. The periphery of circular plate 46 is tapered to provide for a snug fit in the opening provided in side wall 36 and to prevent said circular plate from passing completely through said opening and into the interior of said housing. Circular plate 46 is prevented from coming out of the opening in side wall 36 by means of rod 58 which has one of its ends connected thereto by any convenient means as for example, a pair of nuts engaging threads formed in the end thereof. The other end of rod 58 is attached to a circular plate 60, generally similar to circular plate 46 but located in the head stock of the winding machine. The details of circular plate 60 will be explained more fully hereinafter.

*Source of power.*—Pedestal 14 at the head end of the machine contains an electric motor 62 (Fig. 3) suspended from the underside of bed or table 10 by suitable brackets 64. A V-belt pulley 66 is secured to the shaft of motor 64 and is connected by means of V-belt 68 to one side of a variable speed pulley 70. Variable speed pulley 70 is rotatably mounted on a stub shaft carried at one end of lever 72. Lever 72 is pivotally mounted at its midpoint on a bracket 74 suspended from bed or table 10 and carries a second variable speed pulley 76 rotatably mounted on a stub shaft on its other end. The second side of variable speed pulley 70 is connected to one side of variable speed pulley 76 by means of V-belt 78. The other side of variable speed pulley 76 is connected by means of V-belt 80 to a V-belt pulley 82 secured to a jack shaft 84 rotatably journaled in suitable brackets suspended from bed or table 10. A tension spring 86 having one of its ends secured to the front wall of pedestal 14 has its other end secured to the stub shaft carrying pulley 76 by means of a connecting member 88 so that the front end of lever 72 is normally held in its lowermost position to cause belts 68, 78 and 80 to move variable speed pulleys 70 and 76 to the position wherein they give the maximum speed reduction. A foot treadle 90 is pivotally carried by a stud 92 mounted on the back wall 94 of pedestal 14.

Figure 3:
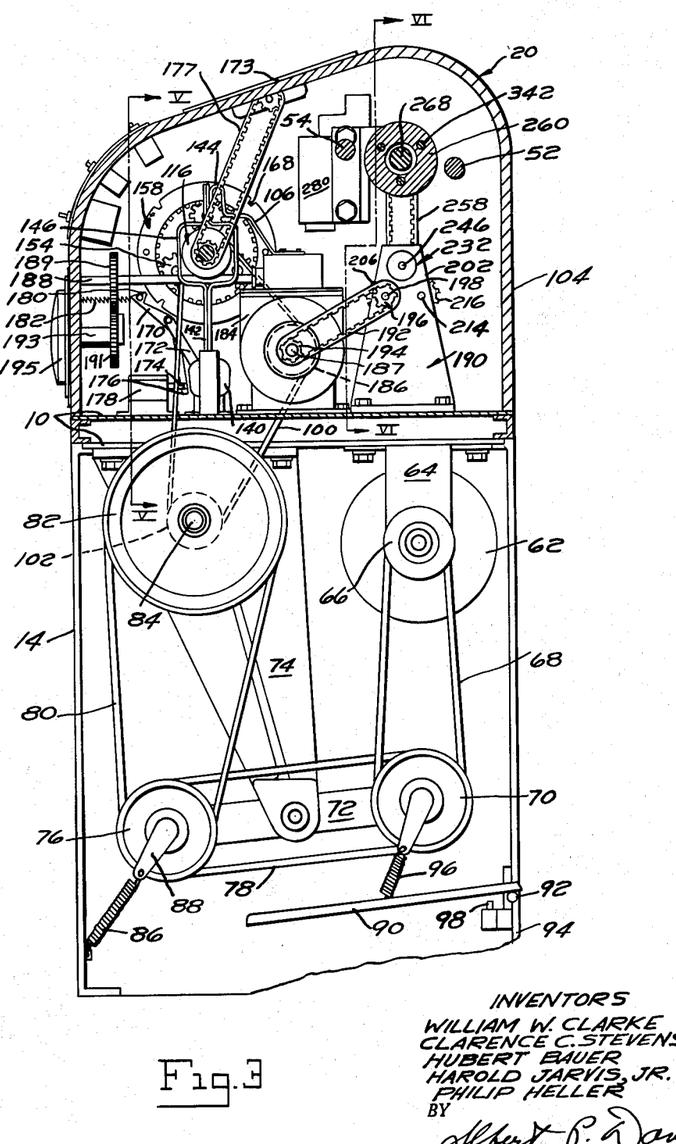
Fig. 3 is a sectional view of the drive head of the coil winding machine taken on the line III—III of Figure 2 and looking in the direction of the arrows.

Foot treadle 94 is connected to the stub shaft carrying variable speed pulley 70 by means of spring 96 so that pivoting foot treadle 90 downwardly will rotate lever 72 in a clockwise direction as viewed in Fig. 3 to cause V-belts 68, 78 and 80 to shift variable speed pulleys 70 and 76 to increase the speed at which pulley 82 and jack shaft 84 are rotated. A single pole double throw switch 98 is mounted on back wall 94 of pedestal 14 adjacent foot treadle 90 and is so arranged with respect to said foot treadle that the initial downward swinging motion of said treadle actuates said switch to close one of its sides to thereby start motor 62 in a manner to be described hereinafter. Power is supplied the winding spindle and the wire traversing means, to be explained in detail hereinafter, by means of a toothed belt 100 which is driven by toothed pulley 102 carried by jack shaft 84.

*Spindle drive.*—The head stock 20 of the coil winding machine comprises a housing member 104, generally similar in shape and size to housing member 26, which contains a winding spindle and traversing means for reciprocating a wire guide. A spindle shaft 106, Figs. 3, 4, 5 and 10, is rotatably journaled in housing member 104 in axial alignment with tail stock shaft 28 by means of bearings 108 and 110 mounted on side walls 111 and 112. The right hand end of spindle shaft 106 extends through the right hand side wall 112 of housing member 104 and has a hand wheel 114 similar to hand wheel 38 secured thereto. A toothed pulley 116 is rotatably mounted on spindle shaft 106 and is engaged and driven by toothed belt 100. Pulley 116 is a unitary structure composed of three parts, a bushing 120, an annular ring 122 having belt engaging teeth formed in its periphery fixedly secured to the periphery of bushing 120 and a pinion gear 124 having an axial rim or flange 126 that is fixedly secured in an annular rabbet or bore located in the left hand end of bushing 120.

Pulley 116 is adapted to be selectively coupled to and disconnected from spindle shaft 106 by means of a clutch mechanism 128. Clutch 128 can be any convenient type of clutch but it is preferred to use a spring type clutch comprising a helical spring 130 having tapered ends, one end of which is loosely received in an annular recess 132 in the right hand end of pulley 116. Annular recess 132 is formed by providing the right hand end of annular ring 122 with a rabbet or bore having a tapered configuration complementary to the tapered end of helical spring 130. A sleeve 134 is keyed to spindle shaft 106 for longitudinal sliding movement therealong and a collar 135 having a diameter equal to the diameter of bushing 120 is pinned to shaft 106 adjacent said bushing. One end of sleeve 134 is provided with a recess 136, the innermost end of which is tapered to complement the taper of the end of spring 130, adapted to fit over the other end of helical spring 130. Helical spring 130 is wound in such a direction that when sleeve member 134 is moved towards pulley 116 to cause the tapered ends of said spring 130 to be engaged by the tapered ends of recesses 132 and 136, the rotation of pulley 116 will tend to wind the spring tighter causing its diameter to decrease so that it firmly grips bushing 120 and collar 135 to thereby rotate said collar and with it spindle shaft 106. Clutch 128 is normally kept engaged by means of a tension spring 138 one end of which is connected to a bracket 139 attached to bed or table 10 and having its other end connected adjacent one end of clutch operating yoke 142.

Clutch 128 is adapted to be disengaged by a solenoid 140 which is mounted on bed 10 beneath spindle shaft 106. The plunger 141 of solenoid 140 is pivotally connected to the lower end of clutch operating yoke 142, the upper end of which is pivotally attached above spindle shaft 106 to a bracket 144. Yoke 142 is divided intermediate its ends to provide a frame-like opening 146 which passes around sleeve member 134. A pair of inwardly extending fingers 148 and 150 project inwardly from frame-like opening 146 and engage in a peripheral groove 152 formed in sleeve member 134. It will, therefore, be seen that energizing solenoid 140 will draw its plunger 141 inwardly pivoting yoke 142 in a counterclockwise direction, as viewed in Fig. 5, against spring 138 to draw sleeve member 134 away from pulley 116 to thereby disengage helical spring 130 from said pulley and said sleeve. De-energizing solenoid 140 permits spring 138 to move sleeve 134 towards pulley 116 to again engage the clutch.

Pinion gear 124 forms the central or sun gear of a planetary gearing arrangement comprising three planet gears 154 carried by spider 156 and meshed with pinion 124. Spider 156 is keyed to spindle shaft 106. Planet gears 154 are also meshed with and carry a ring gear 158. Ring gear 158 is a unitary structure comprising a central ring member 160 provided with internal gear teeth and a pair of similar ring members 162, one of which is secured on each side of central ring member 160 by any convenient means as for example, rivets 164. The internal diameter of ring members 162 is substantially equal to the pitch diameter of the gear teeth on toothed ring member 160 so that the two members 162 each form an inwardly extending flange on ring gear 158 which functions to hold said ring gear 158 on the planet gears 154. The outside diameter of ring members 162 is greater than the outside diameter of the toothed ring member 160 so that they form a pair of outwardly extending flanges 166 on the ring gear 158. A plurality of notches 168 are formed in flanges 166 and are adapted to be engaged by a latch member 170 when it is desired to clamp or hold ring gear 158 against rotation.

Latch member 170 is pivotally mounted intermediate its ends for swinging movement in the plane of ring gear 158 on a bracket 172 fixed to bed 10. The lowermost end or tail 174 of latch 170 is pivotally connected to the plunger 176 of solenoid 178 carried by bed 10. The uppermost end of latch member 170 is located adjacent to periphery of ring gear 158 and is provided with a notch engaging nose or projections 180. A tension spring 182 has one of its ends connected to the front wall of housing 104 and its other end connected to the upper end of latch member 170 so that said latch 170 is normally spring urged in a counterclockwise direction, as viewed in Fig. 3, to normally maintain its nose 180 disengaged from the notches 168 in ring gear 158. When solenoid 178 is energized its plunger 176 will be drawn to the left, as viewed in Fig. 3, pivoting latch member 170 in a clockwise direction against spring 182 to bring its nose 180 into one set of notches 168 in ring gear 158 to thereby lock said ring gear against rotation. De-energizing solenoid 178 permits spring 182 to release latch 170 from the ring gear.

It will, therefore, be apparent to those skilled in the art that spindle shaft 106 can be completely disconnected from the source of power so that it will remain stationary while motor 62 rotates by energizing solenoid 140 to cause it to disengage clutch 128. It will also be apparent that spindle shaft 106 can be driven directly from belt 100 by de-energizing solenoid 140 to permit spring 138 to cause clutch 128 to become engaged. It is also apparent that spindle shaft 106 can be driven at a reduced rate of speed by disengaging clutch 128 by energizing solenoid 140 and at the same time energizing solenoid 178 to cause latch member 170 to engage ring gear 158 and hold it against rotation. Locking ring gear 158 causes planet gears 154 to run around the inner periphery of ring gear 158 when they are rotated by pinion gear 124 thus rotating spider 156 and with it spindle shaft 106.

A revolution counter 173 is mounted in the top of housing 104 and is driven by spindle shaft 106 by means of toothed pulley 175 on said shaft and toothed belt 177 connecting pulley 175 to the drive pulley of said counter. Counter 173 functions to record the number of revolutions made by spindle shaft 106 to thus provide a record of the number of turns of wire placed in the coils being wound.

*Traversing mechanism.*—A traversing mechanism is provided to reciprocate wire guide means longitudinally of arbor 39 at a speed that bears a definite relationship to the speed of rotation of spindle shaft 106. The relationship or ratio of the speed with which the wire guide is reciprocated with respect to the speed of spindle shaft 106 is adjustable to make it possible for the coil winding machine to wind coils from wire having different diameters and to have the turns of wire lie closely adjacent to one another and to make the changeover from one diameter wire to another diameter wire a quick and simple operation that can be performed by the operator of the machine. The traversing mechanism is driven by an infinitely variable speed transmission 184, Figs. 3, 4 and 5, mounted on bed or table 10 to the rear of spindle shaft 106. Any convenient type of variable speed transmission may be employed, the present coil winding machine utilizes an infinitely variable speed transmission manufactured and sold by Graham Transmissions, Inc., 3754 North Holton Street, Milwaukee, Wisconsin, and identified as their Model 20E variable speed transmission. Transmission 184 is provided with a power input shaft 185 at one end and a power output shaft 187 at the other end thereof. A speed adjusting shaft 188 projects from the front of transmission 184 and functions to adjust the speed changing ratio of said transmission upon being rotated to cause output shaft 187 to rotate faster or slower. The free end of speed adjusting shaft 188 is journaled in the front wall of housing 104 and a gear 189 is fixedly secured thereon adjacent said front wall. Gear 189 is meshed with gear 191 fixedly secured on stub shaft 193 journaled in and passing through the front wall of housing 104. A dial 195 is fixedly secured to stub shaft 193 adjacent the front face of housing 104 and is adapted to be rotated to turn said stub shaft and through gears 189 and 191 turn speed adjusting shaft 188 to adjust the ratio of transmission 184. Dial 195 may be calibrated in any desired manner; however, it is preferred to calibrate it to read turns per inch of traverse, i. e. the number of revolutions spindle shaft 106 makes during the movement of the traverse mechanism through a distance of one inch. Variable speed transmission 184 is driven by toothed belt 100 engaging a toothed pulley 186 fixedly secured to the input shaft 185 thereof.

A reversing mechanism 190, see Figs. 3, 4, 5, 6, 7, 8, 9 and 14, is driven by toothed belt 192 which connects toothed pulley 194, fixed to the output shaft 187 of variable speed transmission 184, and toothed pulley 196 fixedly attached to shaft 198 of the reversing mechanism 190. Shaft 198 is rotatably journaled in two upstanding bracket members 200 and 202 that are fixedly secured to bed 10. A pair of gears 204 and 206 are fixedly secured to shaft 198 between bracket members 200 and 202 for rotation by said shaft. Gear 206 is meshed with and drives gear 212 rotatably mounted on shaft 214. Shaft 214 is fixedly mounted between bracket members 200 and 202 to the rear of and at the same level as shaft 198. A second gear 216 is carried by shaft 214 for rotation by gear 212 by means of pin 218 which connects said gears 212 and 216 together. A pair of gears 220 and 222 are rotatably journaled in bracket members 200 and 202 respectively intermediate and above shafts 198 and 214. Gear 220 is rotatably journaled in bracket 200 by means of its extended hub 224 and gear 222 is rotatably journaled in bracket 202 by means of its hub 226. Gear 204 is meshed with gear 220, and gear 222 is meshed with gear 216 carried by shaft 214. It will, therefore, be seen that gears 220 and 222 are rotated in opposite directions. A hollow shaft 210 is rotatably journaled in the hubs 224 and 226 of gears 220 and 222 and carries a toothed pulley 228 fixedly secured thereon between said gears 220 and 222. Means comprising two spring clutch mechanisms 230 and 232 are associated with gears 220 and 222 respectively to alternately couple with said gears to hollow shaft 210 to drive it and toothed pulley 228 first in one direction and then to reverse its direction of rotation. Inasmuch as the two spring clutch mechanisms 230 and 232 are identical, only one of them will be explained in detail herein.

Figures 7, 8:
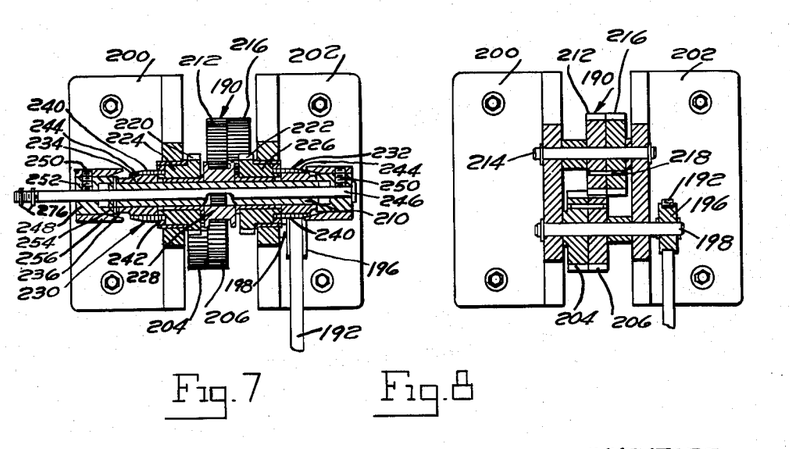
Fig. 7 is a fragmentary sectional view, with parts broken away, taken on the line VII—VII of Figure 6 and looking in the direction of the arrows, showing the traverse reversing mechanism.
Fig. 8 is a fragmentary sectional view, taken along the line VIII—VIII of Fig. 6 and looking in the direction of the arrows, showing another detail of the traverse reversing mechanism.
Figure 9:
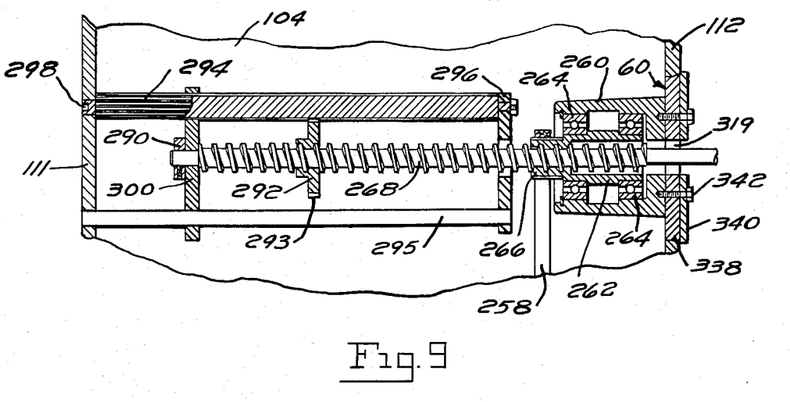
Fig. 9 is a fragmentary sectional view of the traverse actuating mechanism and the mechanism for actuating the reversing mechanism.
Figure 10:
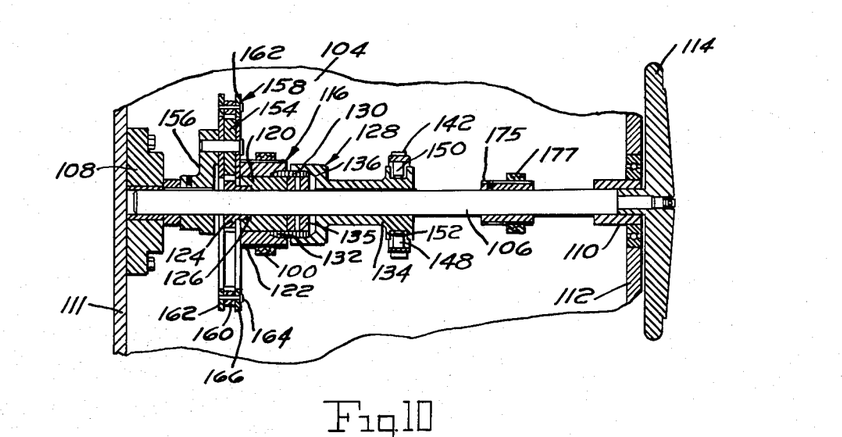
Fig. 10 is a fragmentary sectional view taken on the line X—X of Figure 5 and looking in the direction of the arrows showing the clutch and planetary gear arrangement for actuating the spindle of the coil winding machine.
Figure 11:
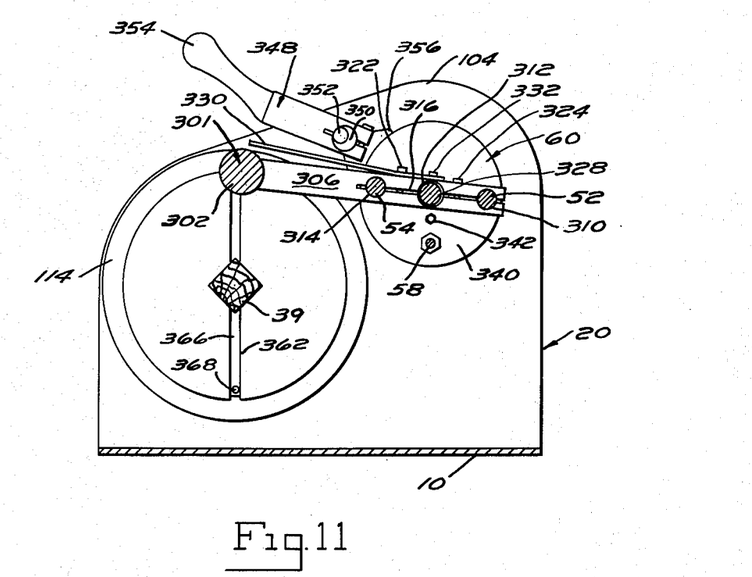
Fig. 11 is a side view of the drive head of the coil winding machine, taken on the line XI—XI of Figure 2 and looking in the direction of the arrows, showing details of the head end hand wheel and the wire guiding mechanism.
Figure 12:
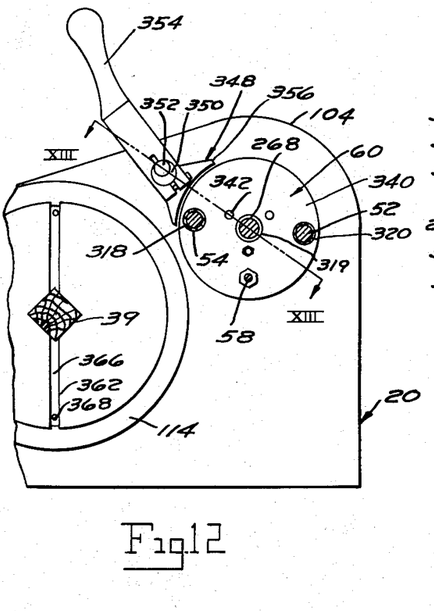
Fig. 12 is a detailed view showing the wire guide locking mechanism.
Figure 13:
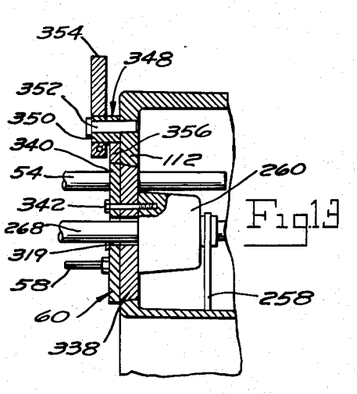
Fig. 13 is a sectional view taken along the line XIII—XIII of Figure 12 and looking in the direction of the arrows.
Figure 14:
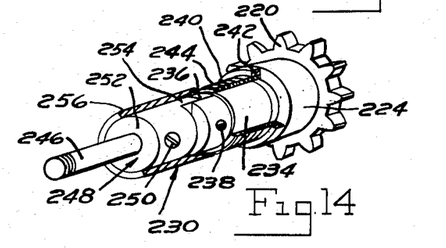
Fig. 14 is a fragmentary perspective view of one of the clutches employed in the traverse reversing mechanism.

Each spring clutch is comprised of a collar 234, Figs. 7 and 14, having a notch 236 extending across one end. Collar 234 is fixedly secured by means of pin or set screw 238 to hollow shaft 210 adjacent the end of hub 224 of gear 220. A helical clutch spring 240 is secured at one of its ends to a flange formed on the end of hub 224 by means of clamping ring 242 in such a manner that said spring 240 extends from hub 224 axially thereof and encircles collar 234. The free end of helical clutch spring 240 is tapered in the manner disclosed at 244. A clutch actuating rod 246 extends through the bore of hollow shaft 210 and has fixed thereto by means of pin or set screw 250 a clutch actuating member 248. Clutch actuating member 248 is comprised of a sleeve or collar 252 having a pair of diametric fingers 254 that are engaged in notch 236 in collar 234, and an annular sleeve 256 carried by collar 252 and having its bore adjacent clutch spring 240 tapered complementary to the taper 244 of said clutch spring. It will, therefore, be seen that when actuating rod 246 is moved to the left, as viewed in Fig. 7, sleeve 256 of clutch 232 will engage its spring 240 causing gear 222 to wind said spring until it engages the periphery of collar 234 and rotates said collar and with it hollow shaft 210, clutch actuating member 248 and clutch actuating rod 246. When clutch actuating rod 246 is moved from left to right the clutch actuating member 248 of clutch 232 will be released from its helical clutch spring 240 thus disconnecting gear 222 from hollow shaft 210 and at the same time clutch actuating member 248 of clutch member 230 will engage its clutch spring 240 to couple gear 220 to hollow shaft 210 to rotate it in the opposite direction. Toothed pulley 228 which is rotated by hollow shaft 210 is connected by toothed belt 258 to the wire guide traversing mechanism.

Figure 6:
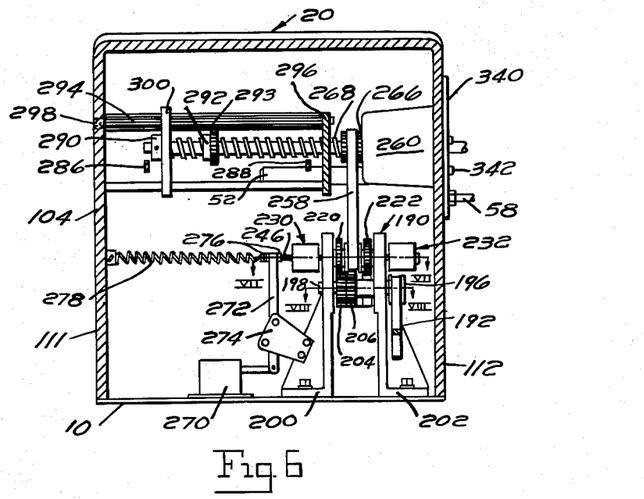
Fig. 6 is a fragmentary elevational view showing the traverse driving and reversing mechanism of the coil winding machine taken on the line VI—VI of Figure 3 and looking in the direction of the arrows.

Clutches 230 and 232 are operated by a solenoid 270, Fig. 6, mounted on bed 10 and acting through a lever 272 pivoted intermediate its ends to arm 274 carried by bracket 200. One end of lever 272 is pivotally attached to the plunger of solenoid 270 and the other end of said lever is bifurcated and engages between a pair of shoulders 276 formed on the left hand end of clutch actuating rod 246. A tension spring 278 having one of its ends attached to the upper end of lever 272 and its other end attached to the left hand side wall 111 of housing 104 tends to rotate said lever 272 in a counterclockwise direction, as viewed in Fig. 6, to normally engage clutch member 232. Upon being energized, solenoid 270 pivots lever 272 in a clockwise direction to disengage clutch member 232 and engage clutch member 230. De-energizing solenoid 270 permits tension spring 278 to disengage clutch member 230 and again engage clutch 232.

A circular plate 60, Figs. 9, 11, 12 and 13, is rotatably journaled in an opening formed in side wall 112 of housing 104 above and to the rear of spindle shaft 106 and in alignment with circular plate 46 in tail stock 18. Circular plate 60 is formed from two discs 338 and 340 held together and concentric to each other by means of bolts 342. A portion of the periphery of inner disc 338 is tapered to provide for a snug fit in the opening provided in side wall 112 and to prevent said disc from passing through said opening. Outer disc 340 is positioned closely adjacent the outer surface of side wall 112 and provides a braking or dogging surface for the wire guide in a manner to become apparent hereinafter. Circular plate 60 is held in position in its opening by means of rod 58, which is attached to tail stock circular plate 46. Three diametrically arranged holes 318, 319 and 320 pass through circular plate 60. Hole 319 is located on the axis of plate 60 and provides a passageway for a lead screw, and holes 318 and 320 support and guide the left hand ends of rods 52 and 54. A bearing housing 260 is fixedly secured to the inner surface of disc 338 in axial alignment therewith and extending into housing member 104. A nut 262 is rotatably supported in bearing housing 260, and held against relative movement axially thereof, by means of suitable bearings 264. One end of nut 262 projects beyond the inner end of bearing housing 260 and is in the form of a toothed pulley 266 which is engaged and driven by toothed belt 258 to rotate said nut 262 first in one direction and then in the other as clutches 230 and 232 are actuated to reverse the direction of hollow shaft 210 and toothed pulley 228. A lead screw 268 is threadedly engaged by nut 262 and extends out of housing member 104 through axial opening 319. Lead screw 268 is held against rotation in a manner to be explained in detail hereinafter, therefore rotation of nut 262 in one direction moves lead screw out of housing 104 and rotation of the nut in the opposite direction moves the lead screw into said housing.

Figure 4:
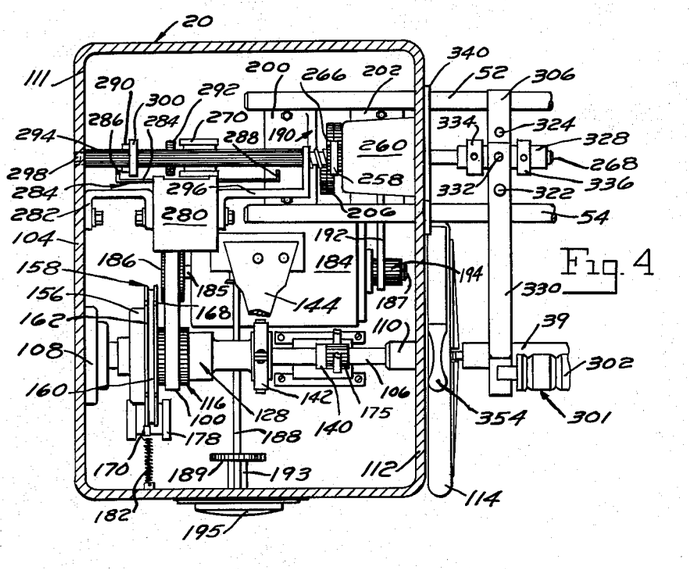
Fig. 4 is a sectional plan view of the drive head of the coil winding machine taken on the line IV—IV of Figure 2 and looking in the direction of the arrows.
Figure 5:
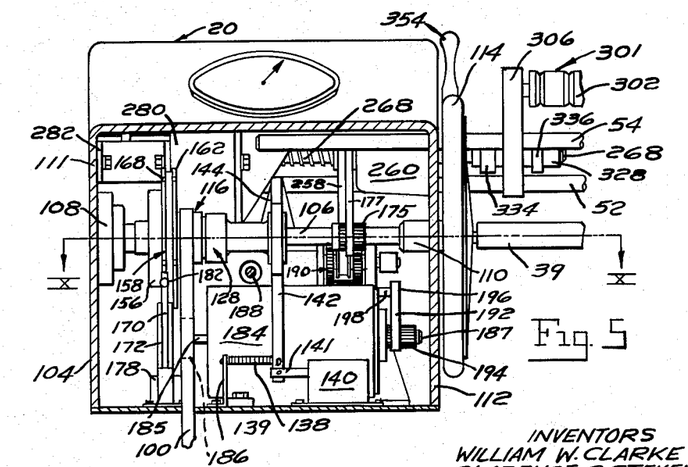
Fig. 5 is a fragmentary sectional elevational view of the drive head of the coil winding machine taken on the line V—V of Figure 3 and looking in the direction of the arrows.

A double pole double throw electrical switch 280, Figs. 3, 4 and 5, is mounted adjacent lead screw 268 by means of bracket 282 attached to left hand side wall 111 of housing 104. Electrical switch 280 is connected to solenoid 270 and indicator lights 344 and 346, Figs. 1 and 2, and functions to energize and de-energize said solenoid to actuate reversing mechanism 190 as one of its sides is opened and closed and to control said indicator lights. Switch 280 is opened and closed by a U-shaped operating member 284 slidably carried on the back thereof with its two legs 286 and 288 extending towards and terminating closely adjacent lead screw 268. U-shaped member 284 upon sliding in one direction functions to close one side of switch 280 to complete an electrical circuit to solenoid 270 and open its second side, and upon sliding movement in the other direction to open said one side of the switch to open the solenoid circuit and close its second side. Two disc-like abutments 290 and 292 are carried by lead screw 268 and are located thereon between the legs 286 and 288 of U-shaped member 284. Abutment 290 is fixed on lead screw 268 at its left hand end. Abutment 292 threadedly engages said lead screw and is capable of being adjusted longitudinally thereof by being rotated. As lead screw 268 is moved to the left, by rotation of nut 262 in one direction, fixed abutment 290 contacts leg 286 and moves U-shaped operating member 284 to the left to operate switch 280 whereby reversing mechanism 190 is shifted to cause said lead screw to move to the right. Movement of lead screw 268 to the right brings movable abutment 292 into engagement with leg 288 and moves U-shaped operating member 284 to the right to again shift reversing mechanism 190 to cause said lead screw to again move to the left. Obviously, the distance movable abutment 292 is spaced from the fixed abutment 290 determines the distance lead screw 268 will reciprocate. Means are provided whereby movable abutment 292 can readily be moved along lead screw 268 to change the spacing between it and fixed abutment 290 to change the distance traversed by said lead screw so that coils having any desired length can be wound. Gear teeth 293 are formed on the periphery of adjustable abutment 292 and are meshed with the teeth of an elongated pinion gear 294 rotatably mounted parallel to and above lead screw 268 by having one of its ends journaled in side wall 111 and its other end journaled in bracket 296 which in turn is carried by electrical switch 280. A wrench engaging socket 298 is provided in the left hand end of the elongated pinion 294 to permit said pinion to be conveniently rotated. The inner end of lead screw 268 is held against rotation by a guide 300 fixedly secured to the left end of said lead screw adjacent fixed abutment 290 and which is slidably journaled on elongated pinion 294 and rod 295.

*Wire guide.*—A wire guide 301, Figs. 1, 2, 4, 5, 11, 12, 13 and 16, is connected to the end of lead screw 268 projecting from housing 104 for reciprocation thereby to traverse a plurality of strands of wire W longitudinally of winding arbor 39 to wind a plurality of coils thereon. The strands of wire W are drawn from a plurality of spools, not shown, carried by any suitable creel, not shown, located behind and above the winding machine and provided with any convenient wire tensioning means. Wire guide 301 is a rigid frame-like structure comprising roller 302, forwardly extending arms 306 and 308, and rods 52 and 54. Rods 52 and 54 are slidably journaled in openings 48 and 50 in tail stock circular plate 46 and openings 318 and 320 in head stock circular plate 60. Arm 308 is mounted on rods 52 and 54 adjacent tail stock 18 by means of holes 315 and 317 and is clamped thereon by drawing slot 321 together by means of bolt 325. Arm 306 is mounted on rods 52 and 54 adjacent head stock 20 by means of holes 310 and 314 and is clamped thereon by drawing slot 316 together by means of bolt 324. A sleeve 328 is securely fastened on the end of lead screw 268 projecting out of housing 104 by any convenient means. Sleeve 328 is slidably received in hole 312 formed in arm 306. Lever arm 330 is pivoted intermediate its ends on arm 306 for limited swinging movement thereon by means of bolt 322. The rearmost end of lever arm 330 carries a locking pin 332 which passes through an opening in arm 306 and engages in a peripheral groove formed in sleeve member 328 to releasably lock wire guide 301 to lead screw 268. A pair of collars 334 and 336 are secured to sleeve member 328 in any suitable manner and spaced from arm 306. Wire guide 301 can be released from lead screw 268 by depressing lever arm 330 to lift locking pin 332 from the peripheral groove in sleeve 328 whereupon said wire guide can be moved relative to said lead screw a limited amount, determined by the spacing of collars 334 and 336. Wire guide 301 is moved relative to lead screw 268 in the above described manner when it is desired to move turns of wire out into the margin or space between coils being wound to facilitate the application of taps thereto in subsequent manufacturing operations.

Wire guide 301 is arranged for pivotal movement around the axis of lead screw 268 to permit wire guiding roller 302 to be moved towards and away from arbor 39. The above described rotation of circular plates 60 and 46 in head stock 20 and tail stock 18 respectively makes possible the pivoting of wire guide 301. Outer disc 340 of circular plate 60 cooperates with a dogging or locking mechanism 348, Figs. 12 and 13, to hold wire guide 301 in any predetermined position. Dogging mechanism 348 comprises an eccentric 350 rotatably journaled on a stud 352 secured to side wall 112 of housing 104 adjacent outer disc 340. A lever arm 354 is fixedly secured to eccentric 350 and is adapted upon rotation thereof to rotate said eccentric. A brake shoe 356 is located between eccentric 350 and the periphery of outer disc 340 and is so proportioned that rotation of said eccentric will force its surface against the periphery of said disc 340 to thereby lock circular plate 60 against rotation and to hold wire guide 301 against pivoting. When it is desired to pivot wire guide 301, lever arm 354 is lifted to rotate the high point of eccentric 350 away from disc 340 thus releasing brake shoe 356 from said disc and making it possible to raise or lower wire guiding roller 302.

*Hand wheels.*—As stated above, a hand wheel 38 is secured to tail stock shaft 28 and a second hand wheel 114 is secured to spindle shaft 106. Hand wheels 38 and 114 are used to turn arbor 39 by hand, as when a stick of coils is being started, and also function to simultaneously hold a completed stick of coils and an empty arbor while the stands of wire W are transferred from the completed stick to the empty arbor. Hand wheels 38 and 114 are identical and, therefore, only hand wheel 114 will be explained in detail. Hand wheel 114 is secured to spindle shaft 106 by means of a hub 358. The face of the hand wheel is convex as indicated at 360, Fig. 17, and a diametric slot 362 is provided in the convex face of the hand wheel. Slot 362 is deepened at its midpoint, in axial alignment with the hand wheel, in the form of an arcuate depression 364. A leaf type spring 366 having a shape generally conforming to the convex face of hand wheel 114 is located in slot 362 and is held therein by suitable means as for example, rivets 368 at each end thereof. The midpoint of spring 366 is bent to form a reentrant portion 370 having sufficient width to fit around the end of arbor 39. A centering pin 372 is located in reentrant portion 370 and is adapted to engage a centering hole provided in the end of arbor 39 whereby said arbor may be centered and held between spindle shaft 106 and tail stock shaft 28 for rotation during the coil winding operation.

When a stick of coils is completed, the operator releases foot treadle 90 to stop motor 62 and the winding machine, strands of wire W are secured to the completed stick of coils by means of a strip of adhesive tape, and the ends of an empty arbor are introduced into the slots 362 of the two hand wheels 38 and 114. As the new arbor is moved towards the axis of the hand wheels, its ends press against springs 366 forcing them deeper into said slots until a point is reached when the reentrant portions 370 release the ends of the arbor carrying the completed stick of coils. Continued inward movement of the empty arbor causes it to engage the full stick of coils to move that stick along said slot 362. While the full stick of coils and the new arbor are side by side, the hand wheels are rotated manually to cause the strands of wire W to pass around said new arbor and said strands of wire W are then attached to the new arbor by means of a strip of adhesive tape. After the wires W are attached to the new arbor they are cut by any suitable means between the new arbor and the completed stick of coils thus freeing the completed stick, after which it is removed from slot 362. The new arbor is then moved into the slot until its ends are gripped by reentrant portion 370 and centering pins 372 engage its centering holes and winding of the new stick of coils is commenced.

Figure 1:
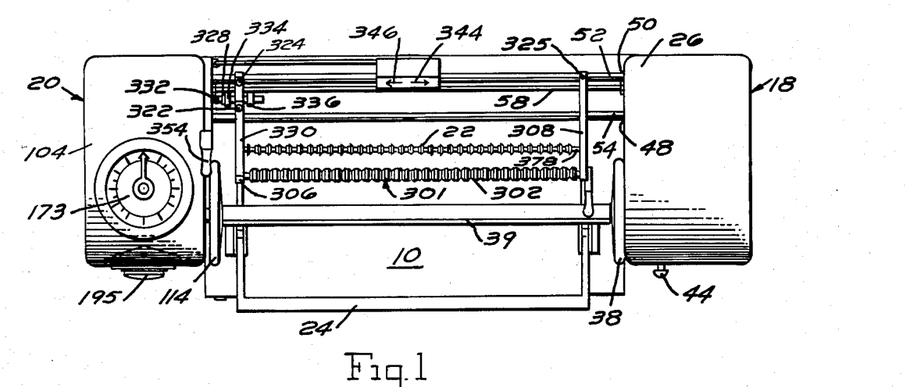
Figure 1 is a plan view of a coil winding machine incorporating the present invention.
Figure 2:
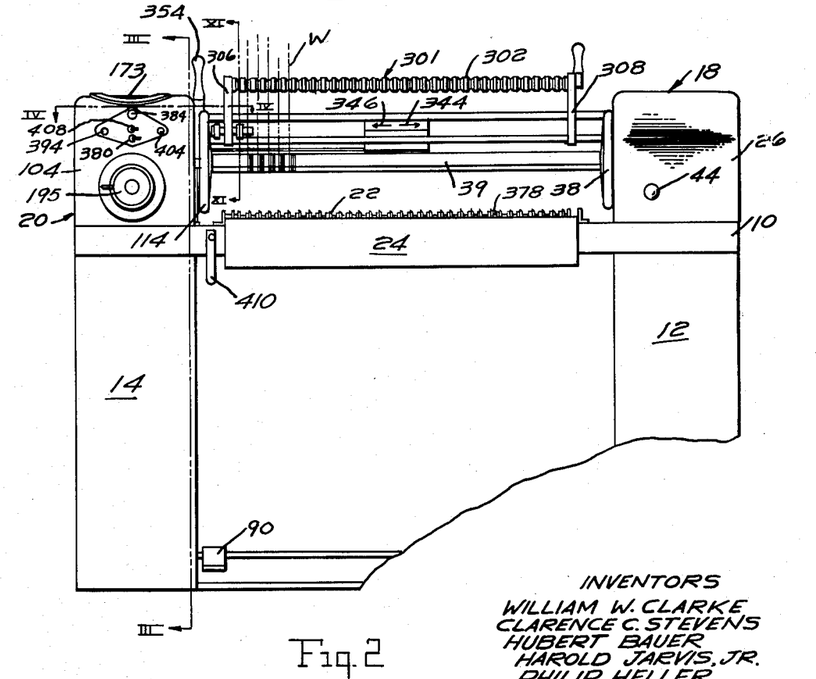
Fig. 2 is a front elevation of the coil winding machine.

*Paper shelf and coil marking blades.*—A paper shelf 24 is pivoted to bed 10 intermediate tail stock 18 and head stock 20. Paper shelf 24 is adapted to be pivoted from a lowered position, as illustrated in Figs. 1 and 2, where it is out of the way to facilitate the removal of a full stick of coils and the insertion of an empty arbor, to a raised position where its surface is substantially level with arbor 39 to hold a supply of insulating paper at a convenient location for its insertion to the coils being wound.

A plurality of circular knives 22 are rotatably carried by a shaft 378 which is suitably mounted on bed 10 in such a manner as to permit knives 22 to be brought into contact with the periphery of a stick of coils being wound as said stick is nearly completed. Knives 22 are adjustable along shaft 378 and are positioned on said shaft so that they will contact the stick of coils between the windings of wire thereon to mark the locations on said stick where it should be cut to sever the several coils one from the other.

Figure 18:
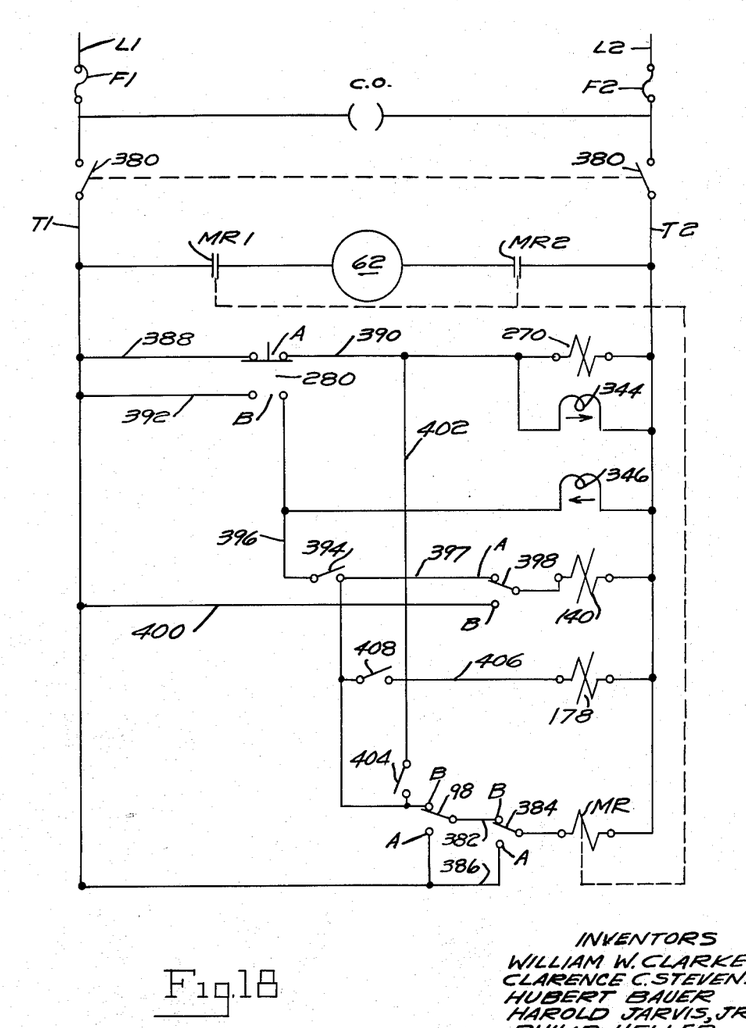
Fig. 18 is a schematic wiring diagram of the coil winding machine.

*Wiring diagram.*—A schematic wiring diagram of the winding machine is shown in Fig. 18. Electrical current to operate motor 62, the various solenoids, and direction indicator lights 344 and 346 is brought into the winding machine by main power lines L1 and L2. Fuses F1 and F2 are provided in lines L1 and L2 respectively. After fuses F1 and F2 lines L1 and L2 are connected to a convenience outlet C. O. which may be physically located on any convenient part of the winding machine such as bed or table 10, tail stock 18 or head stock 20. The purpose of convenience outlet C. O. is to make it possible to connect an electric soldering iron or other appliance requiring electric power. Lines L1 and L2 are connected to one set of terminals of a double pole single throw switch 380 which functions as the main power switch for the winding machine. Lines T1 and T2, which distribute the electric current throughout the coil winding machine, are connected to the other set of terminals of switch 380. Line T1 is connected to side A of the single pole double throw treadle switch 98. Treadle switch 98 is connected by means of lead 382 to side B of single pole double throw jog switch 384, and jog switch 384 is connected to one side of motor relay MR. The other side of motor relay MR is connected to line T2. Upon actuating treadle switch 98 to close its side A, a circuit is closed which includes line T1, treadle switch 98, jog switch 384, motor relay MR and line T2 to close motor relay switches MR1 and MR2 to start motor 62. A lead 386 extends from line T1 to side A of jog switch 384 to make it possible to bypass treadle switch 98 by closing side A of said jog switch to thereby operate the winding machine for short intervals without moving foot treadle 90. A lead 388 connects line T1 to one terminal of side A of double pole double throw reversing switch 280. The other terminal of side A of switch 280 is connected by means of lead 390 to one side of solenoid 270 and the other side of said solenoid is connected to line T2. Solenoid 270, when energized, operates reversing mechanism 190. Lead 390 is also connected to one side of indicator light 344, the other side of which is connected to line T2. Line T1 is connected to one terminal of side B of double pole double throw switch 280 by means of lead 392. The second terminal of side B of double pole double throw switch 280 is connected to one side of indicator light 346, the other side of which is connected to line T2. When side A of switch 280 is closed, the condition illustrated in Fig. 18, current flows through reversing solenoid 270 to energize it, and indicator light 344 is on to show that the traverse mechanism will move from left to right. When side B of switch 280 is closed solenoid 270 is de-energized and indicator light 346 is on to indicate that the traverse mechanism will move from right to left. The second terminal of side B of switch 280 is also connected to side B of treadle switch 98 by means of a lead 396 which includes normally open single pole single throw switch 394. The normally open side of lead 396 is connected to side A of knee operated single pole double throw switch 398 by means of lead 397. The other side of switch 398 is connected to one side of spindle clutch operating solenoid 140 the other side of which is connected to line T2. Line T1 is directly connected to side B of knee operated switch 398 by means of lead 400. Lead 390 extending from side A of reversing switch 280 is connected to side B of treadle operated switch 98 by means of lead 402 which includes normally open single pole single throw switch 404. Lead 396 extending from side B of reversing switch 280 is connected to one side of planet ring gear operating solenoid 178 by means of a lead 406 which includes normally open single pole single throw space wind switch 408.

The electrical system of the coil winding machine functions in the following manner. Switch 380 is closed to make available electrical current to the machine. Current flows through lead 388, side A of switch 280 and lead 290 to reversing mechanism operating solenoid 270 to energize that solenoid to thereby condition the reversing mechanism to move the wire guide traversing means from left to right and at the same time indicator light 344 is lit to indicate that the wire guide will travel from left to right. Treadle switch 98 is moved by manipulating foot treadle 90 to close its side A thus energizing motor relay MR to start motor 62 to rotate spindle shaft 106 and reciprocate wire guide 301. As the traversing mechanism approaches the end of its stroke in the right hand direction, the movable abutment 292 carried by lead screw 268 actuates switch 280 to open side A and close side B thereof. Opening side A of switch 280 de-energizes solenoid 270 permitting reversing mechanism 190 to traverse wire guide 301 from right to left, and closing side B of switch 280 closes the circuit to indicator light 346 to show that direction of traverse. At the end of the right to left movement of the traverse mechanism the fixed abutment 290 on lead screw 268 actuates switch 280 to open its side B and close its side A to again energize solenoid 270. The coil winding machine will continue to operate in this manner as long as side A of treadle switch 98 is closed.

When it is desired to "space wind" in a stick of coils, i. e. have the adjacent turns of wire in a given layer of the coil spaced from each other instead of being closely packed as is the case in a normal winding operation, treadle switch 98 is moved to close side B thereof thus stopping the machine, and space wind switch 408 is closed.

With reversing switch 280 in the position illustrated in Fig. 18, i. e. with side A thereof closed, switch 404 is closed to permit current to pass through motor relay MR to start motor 62 and to pass current through solenoid 178 by means of lead 406 to energize said solenoid and cause it to latch planetary ring gear 158. Closing switch 404 also permits current to pass through solenoid 140 by means of lead 397 to cause it to release spindle clutch mechanism 128. When the traversing mechanism has reached the end of its left to right stroke reversing switch 280 will be actuated in the above described manner to open side A thereof and close side B. This actuation of reversing switch 280 disconnects lead 402 from line T1 to thereby stop the operation of the winding machine. When this occurs switch 404 is opened and switch 394 is closed to again send current through motor relay MR and solenoids 140 and 178.

When switches 98 and 408 are in the positions illustrated in Fig. 18, i. e. with switch 408 open and side A of switch 98 open wire guide 301 can be moved along arbor 39 without winding wire thereon by manipulating either switch 394 or 404, depending on the position of switch 280. When side A of switch 280 is closed and switch 404 is closed current will pass through relay MR to start motor 62. At the same time current will pass through spindle clutch solenoid 140 to energize it and disconnect the spindle clutch. Inasmuch as solenoid 178 is not energized the spindle shaft is thus completely disconnected from motor 62 and does not rotate but the wire guide is moved until switch 280 is operated by the traverse mechanism. When side A of switch 280 is opened and side B thereof closed, switch 394 must be closed to move wire guide 301 without rotating shaft 106.

It is often desirable at the start of winding a stick of coils, or as a stick of coils nears completion, to jog or inch the machine a few turns at a time. This may readily be accomplished by leaving treadle switch 98 in its inoperative position wherein side B thereof is closed and manipulating switch 384 to close side A thereof.

It is also often desirable at the start or completion of a stick of coils to have winding arbor 39 and spindle shaft 106 disconnected from the spindle driving mechanism so that said arbor and shaft can be rotated by hand. Operating switch 398 to close side B thereof closes a circuit which permits electric current to flow through solenoid 140 to release spindle clutch 128 without starting motor 62 or latching planetary ring gear 158, and thus permit said spindle shaft and arbor to be freely rotated.

*Arrangement of controls.*—As previously set forth, treadle operated switch 98 is located on pedestal 14 adjacent to treadle 90 and in such a position that downward movement of said treadle operates said switch to start motor 62 for a normal winding operation. Also, as previously explained, reversing switch 280 is located inside of head stock housing 104 in such a position that it is operated by abutments 290 and 292 carried by lead screw 268. Switch 398 which functions to release spindle clutch 128 by energizing solenoid 140 to release spindle shaft 106 from the driving mechanism is preferably located beneath bed or table 10 adjacent head stock pedestal 14 and is provided with a depending operating handle or lever 410 to permit said switch to be manipulated by the operator's knee. The remaining switches 380, 384, 394, 404 and 408 are all mounted on the face of head stock housing 104.

*Operation of machine.*—After arbor 39 has been placed between hand wheels 38 and 114 and wires W attached thereto, all in the above described manner, foot treadle 90 is depressed to actuate treadle switch 98 and to thereby start motor 62. The speed with which the winding operation takes place can be controlled, within limits, by raising or lowering foot treadle 90 to rock lever 72 and to thereby shift variable speed pulleys 70 and 76 carried thereby. Motor 62 acting through variable speed pulleys 70 and 76 and belts 68, 78 and 80 drives toothed belt 100. Toothed belt 100 in turn rotates the input shaft 185 of variable speed transmission 184 and toothed pulley 116 carried by spindle shaft 106. Toothed pulley 116 is normally coupled to spindle shaft 106 by clutch mechanism 128 so that rotation of said toothed pulley 116 normally rotates said shaft and with it arbor 39.

The output shaft 187 of variable speed transmission 184 is connected to and drives reversing mechanism 190 by means of toothed belt 192. The output pulley 228 of reversing mechanism 190 acting through toothed belt 258 rotates nut 262 which reciprocates lead screw 268. Double pole double throw switch 280 is operated by movable abutment 292 and fixed abutment 290 carried by said lead screw to alternately energize and de-energize solenoid 270 whereby reversing mechanism clutches 230 and 232 are alternately engaged and disengaged. Reciprocation of lead screw 268 in this manner moves wire guide 301 longitudinally of arbor 39 to cause the turns of wires W to be laid adjacent to each other.

The machine may be adjusted to permit winding different diameter wires by rotating dial 195 thereby operating speed adjusting shaft 188 to change the ratio of variable speed transmission 184.

When it is desired to increase or decrease the lengths of coils being wound a suitable wrench is inserted in wrench engaging socket 298 formed in the end of the elongated pinion 294 and said pinion is thereby rotated. Rotation of elongated pinion 294 rotates movable abutment 292, which threadedly engages lead screw 268, to move said abutment towards or away from fixed abutment 290.

When the last layer of wire is being wound on the stick of coils, marking blades 22 are swung upwardly and into contact with said stick of coils to score the surface thereof to provide a mark to facilitate severing the individual coils in a subsequent operation.

As the last layer of wire nears completion foot treadle 90 is released to stop the machine and jog switch 384 is depressed to "inch" the machine along until revolution counter 173 indicates that the desired number of turns of wire have been placed on the coils. If too many turns of wire are placed on the stick they may be removed by first stopping the machine by releasing foot treadle 90 or jog switch 384, swinging knee operated lever 410 to actuate switch 398 and to thereby energize solenoid 140 and release spindle clutch 128. Knob 44 is then pulled to release helical spring 40 from tail stock shaft 28 whereupon hand wheels 38 and/or 114 can be freely rotated in an unwinding direction.

When it is desired to "space wind" foot treadle 90 is released to thereby stop the operation of the machine and space wind switch 408 is closed. Following this either switch 394 or 404, depending upon which indicator light 344 or 346 is lit, is closed to start motor 62 and to energize both spindle clutch operating solenoid 140 and planet latch operating solenoid 178 to thereby release the direct coupling between spindle pulley 116 and spindle shaft 106 and to clamp ring gear 158 whereby rotation of pulley 116 is transmitted to spindle shaft 106 through sun gear 124 and planet gears 154 whereby the speed at which said shaft rotates is reduced while the longitudinal speed of lead screw 268 and wire guide 301 remains the same.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a coil winding machine the combination comprising a spindle adapted to rotate an arbor, a guide adapted to guide a strand of wire onto said arbor, a sun gear rotatably mounted on said spindle, a normally engaged clutch coupling said sun gear to said spindle whereby rotation of said sun gear will directly rotate said spindle when said clutch is engaged, a cage fixed to said spindle, a planet gear carried by said cage and meshed with said sun gear, a ring gear meshed with said planet gear and normally free to rotate, a source of power for rotating said sun gear, traversing means driven by said source of power and moving said guide longitudinally of said arbor, disengaging means for said clutch member, and holding means for selectively holding said ring gear against rotation or permitting it to rotate when said clutch is disengaged to cause said spindle to rotate at a different speed when said ring gear is held and to permit it to stop rotating when said ring gear is free to rotate.

2. In a coil winding machine the combination comprising a spindle adapted to rotate an arbor, a sun gear rotatably mounted on said spindle, a clutch normally coupling said sun gear directly to said spindle, a cage fixed to said spindle, a planet gear carried by said cage and meshed with said sun gear, a ring gear meshed with said planet gear and normally free to rotate, a source of power for rotating said sun gear, a guide adapted to guide a strand of wire onto said arbor, means driven by said source of power and reciprocating said guide longitudinally of said arbor at a rate having a predetermined ratio to the speed of rotation of said sun gear, disengaging means for said clutch, and holding means for holding said ring gear against rotation when said clutch is disengaged whereby said spindle rotates at a different speed while said guide is reciprocated at the same speed.

References Cited in the file of this patent

UNITED STATES PATENTS

| | | |
|---|---|---|
| 715,078 | Jeffs | Dec. 2, 1902 |
| 765,346 | Smith | July 19, 1904 |
| 1,403,658 | Zweigbergk | Jan. 17, 1922 |
| 1,456,956 | Williams | May 29, 1923 |
| 1,649,050 | Winch | Nov. 15, 1927 |
| 1,706,888 | Krauss | Mar. 26, 1929 |
| 1,978,416 | Dodge | Oct. 30, 1934 |
| 2,161,459 | Demay | June 6, 1939 |
| 2,305,085 | Jacob et al. | Dec. 12, 1942 |
| 2,467,627 | Olson | Apr. 19, 1949 |
| 2,580,792 | Karlsson | Jan. 1, 1952 |
| 2,597,375 | Rinehart | May 20, 1952 |
| 2,609,163 | La Cesa | Sept. 2, 1952 |
| 2,699,297 | Weinreich et al. | Jan. 11, 1955 |